Sept. 6, 1938.  H. J. L. FRANK ET AL  2,128,998
TROLLEY DUCT
Filed May 6, 1935  2 Sheets-Sheet 1
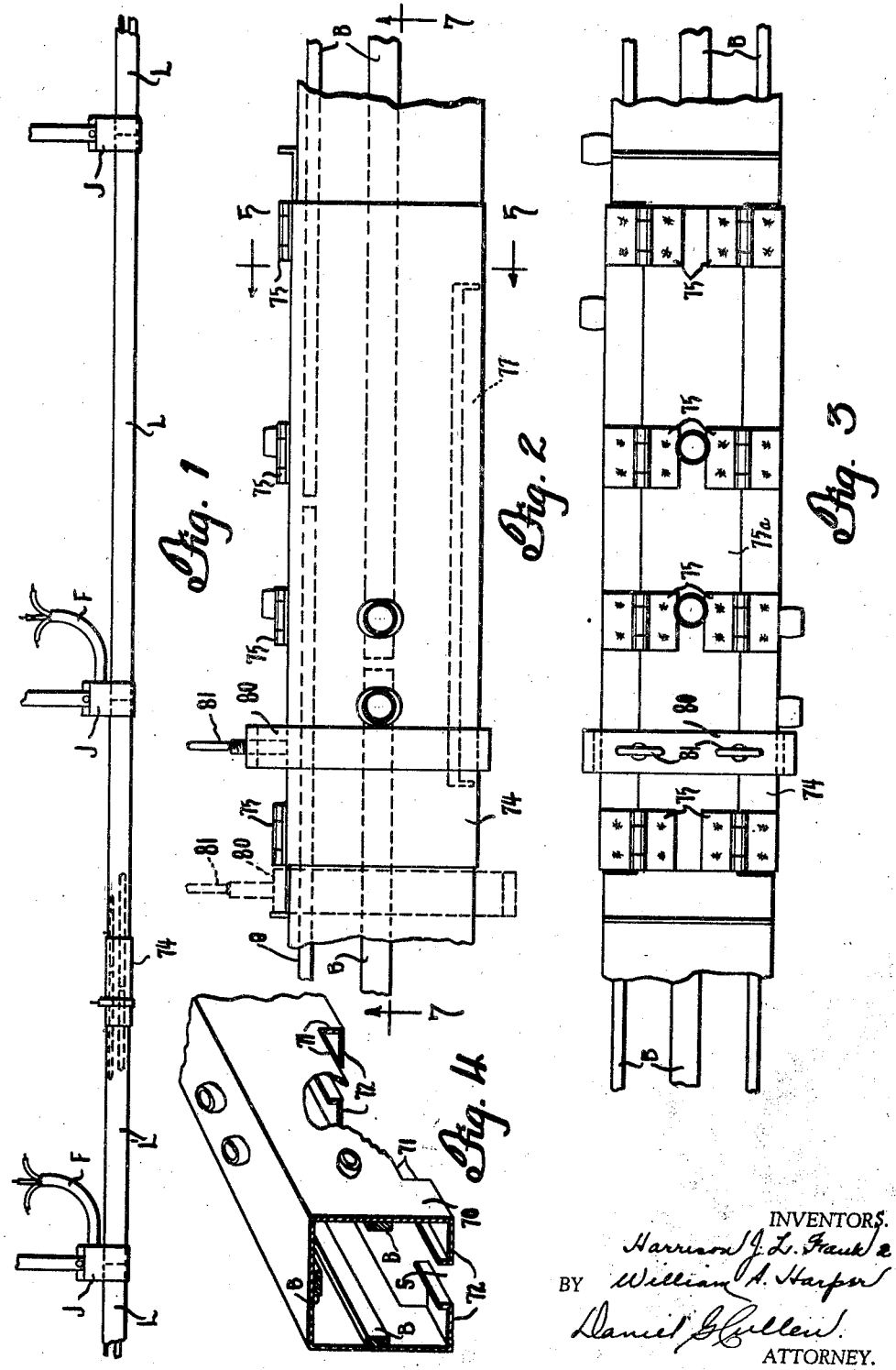
INVENTORS.
Harrison J. L. Frank
William A. Harper
BY
Daniel G. Cullen
ATTORNEY.

Sept. 6, 1938.  H. J. L. FRANK ET AL  2,128,998
TROLLEY DUCT
Filed May 6, 1935   2 Sheets-Sheet 2
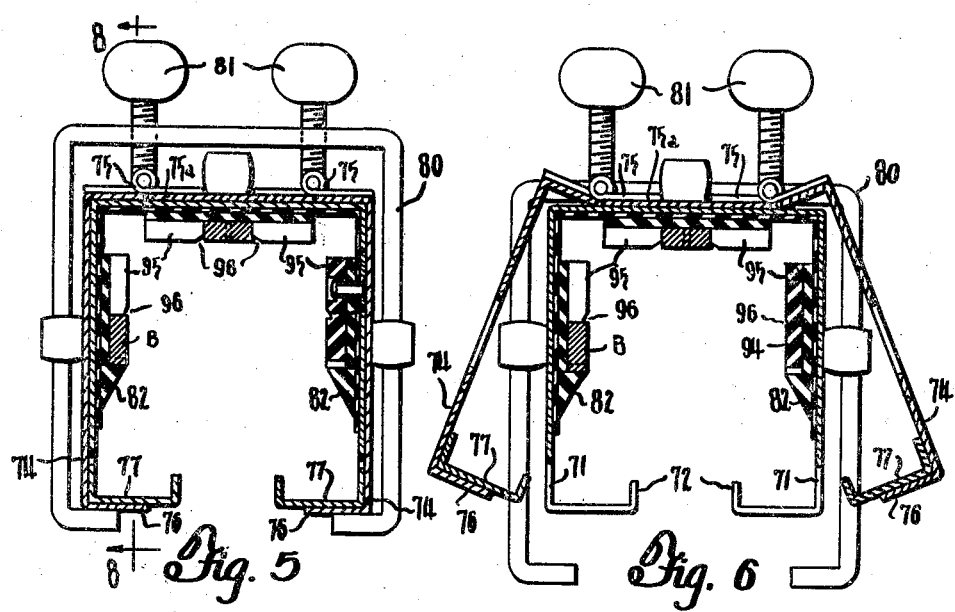
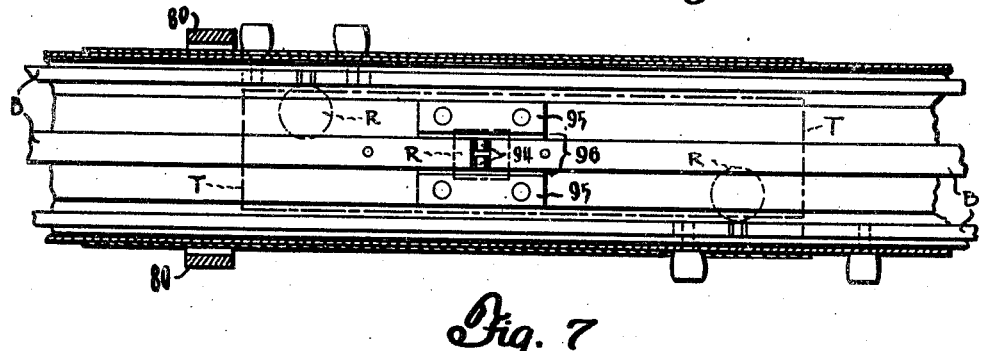
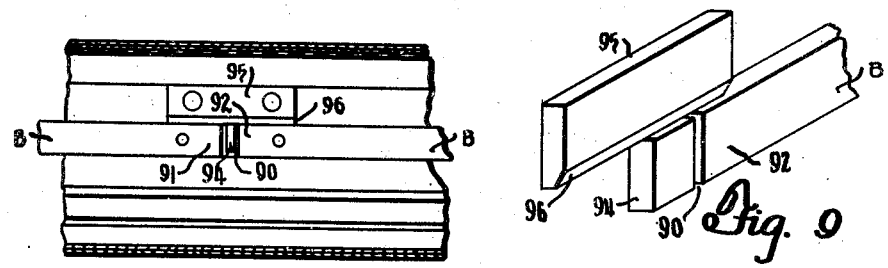
INVENTORS
Harrison J. L. Frank &
BY William A. Harper
Daniel J. Kullen
ATTORNEY.

Patented Sept. 6, 1938

2,128,998

UNITED STATES PATENT OFFICE 2,128,998

TROLLEY DUCT

Harrison J. L. Frank and William A. Harper, Detroit, Mich.

Application May 6, 1935, Serial No. 20,112

7 Claims. (Cl. 247—3)

This application relates to current distribution systems and more particularly to a trolley bus duct forming part of a current distribution system.

A trolley bus duct system of the character here disclosed is of the rectangular hollow casing type, and is made up of standard sections or lengths, each having bus bars and a narrow elongated continuous riding slot in its bottom wall. The sections or lengths are joined end to end to form a bus duct run with the casing of one length or section joined at its ends to the ends of the casings of its neighbors and with the bus bars of one length or section joined at their ends to the ends of the bus bars of the neighboring sections or lengths, and feed in from external supply feeders is accomplished at desired ones of the junctures of sections or lengths.

In order to permit trolleys to be inserted or plugged into said duct run at convenient points intermediate the ends thereof, even though such trolleys are not of the type that because of their own construction can be inserted into the duct run through the narrow slot, desired ones of the sections are formed with intermediate entrances. These are in the nature of slot enlargements or cutouts through which may be inserted the trolleys, the cutouts being normally closed by hingedly mounted fill-in portions which normally fill in the cutouts, but which may be swung open to expose them for trolley insertion. The fill-in portions maintain uninterrupted the smooth continuity of the duct run and have rail portions forming replacements of the cutaway rail portions.

This application discloses, in connection with such entrance means, a sectionalizing arrangement of bus bars whereby portions of duct run may be relatively isolated electrically, such isolation being effected by providing gaps between ends of bus bars, so that the bus bars of one portion are out of electrical continuity with bus bars of another portion.

In the fabrication and installation of a system, it is proposed to manufacture three kinds of standard sections: plain sections, plain entrance sections, and sectionalizing entrance sections. Plain sections would be used except where the other kind of section is required. Plain entrance sections, similar to the plain sections but equipped with an entrance means, would be used wherever an entrance is required. Sectionalizing entrance sections, similar to the plain entrance sections but formed with gaps in the bus bar runs, would be used whenever it is desired to divide a run electrically by isolating the bus bars of one portion from those of another portion.

The provision of the gaps at the entrances is of advantage in other respects as will now be shown. Because trolley insertion is at a "dead" point of the bus duct run, there will occur no sparking or arcing or accidental short circuits as the trolley roller contacts engage the surfaces on which they roll, and not until after the trolley is rolled away from the entrance will the rollers become energized. Further, if the gaps are made as long as the entrance cutouts or nearly so, as might well be done, the entrances will not afford access to the "live" bus runs for malicious purposes or for accidents; under such circumstances, "live" bus runs will be so far removed from the entrances as to be inaccessible except for trolleys inserted through the entrances and rolled away therefrom onto "live" parts of bus runs.

In the determination of the location of the gaps, care is taken to match the position of the gaps with respect to one another to the position of the trolley roller contacts to one another with the result that all the contacts cross the gaps simultaneously. This insures the interruption of current flow to the trolleys being as brief as possible and also prevents certain trolley contacts being "live" while others are dead, which is of importance in the event the bus duct run is a polyphase run in that it eliminates the possibility of the trolley load being "single phased".

Isolation is of value primarily in that it prevents short circuits or other electrical disturbances in one portion or section of a run from affecting those portions or sections of the run electrically isolated from the faulty portion or section; in other words, such isolation localizes disturbances in the portion or sections or circuit in which occur such disturbances.

Inasmuch as trolley contact rollers ride along the bus bars, means are provided in each gap between bus bar ends to bridge such gap without relatively connecting the bus bar ends electrically, so that the rolling of the roller from one bus bar to the other may be smooth, despite the electrical gap between these bus bar ends. Each bridge means is of insulation and prevents the roller from dropping into the gap, it being observed that if the roller were to drop into the gap great harm would be done to the roller, and in addition the main object of the invention would be defeated for the roller might be in electrical contact with both bus bar ends on opposite sides of the gap and consequently might electrically connect them.

By virture of the provision of the gaps and their bridge means at the entrances, the widening of the slot at the entrances functions not only to permit trolley entrance or drop out, but also to provide convenient access to the gaps and the bridge means, which is of course desirable, since repairs, adjustments, cleaning, and replacements of parts at such gaps might be found necessary. If the gaps were not at the entrances, access to the gaps might not be so convenient, since access would be only through the slot and this is relatively narrow. However, while it is preferred to have the gaps at the entrances, this is not necessary, and it is possible and contemplated to provide gaps in standard sections not provided with entrances. Further, while the gaps are preferably remote from section junctures, it is possible and contemplated to have the sectionalizing gaps at section junctures, concurrent with undesired bus gaps at such junctures. Under such circumstances, whether the gaps be used for sectionalizing or not, the presence of the bridge pieces is desirable to provide smooth roll of trolleys.

For an understanding of the disclosure of this application, reference will be had to the appended drawings. In these drawings, Fig. 1 shows, to small scale, a trolley bus duct run of four sections, three of which are plain, and one of which is of the entrance-sectionalizing kind; feed-in is shown at the junctures of this section with its neighbors;

Figs. 2 and 3 are fragmentary enlarged scale views of the entrance-sectionalizing section;

Fig. 4 shows the cutaway at an entrance;

Figs. 5 and 6 are closed and open condition views of the entrance parts, as if in section on line 5—5, Fig. 2;

Figs. 7 and 8 are sections as if on line 7—7, Fig. 2, line 8—8, Fig. 5;

Fig. 9 shows a bridge piece in perspective.

In the fabrication of a duct run, lengths or sections L are joined end to end by junctures J which may be used, where desired, as hangers and as cable entrances for feed-in of the run from external supply feeders F. Some of the sections of the fragmentary run shown are of the plain kind, and one, marked L', is of the entrance-sectionalizing kind.

An entrance section, whether or not it be equipped with sectionalizing details, has the lower part of its sheet metal casing cut away below the level of the bus bars B, substantially as indicated in Fig. 4, which shows a sheet metal casing 70 cut away on the cut lines 71. This cuts off the bottom of the casing and the rail flanges 72 and enlarges the slot or runway S at the bottom of the casing, in alignment with the cut lines 71. These enlargements permit insertion into the duct of suitable trolleys.

Since the bottom of the casing, where it is cut away, is not restricted by the bottom wall, the insertion or removal of a trolley or collector at this point is a simple matter, as can readily be observed; however, the bottom must be closed and the rail flanges 72 continued if a satisfactory distribution system is to be provided; otherwise the trolley would drop out whenever it reached an intermediate entrance.

At the entrance there is provided, on each side of the section, a swinging carrier plate 74, hinged at 75, to a plate 75a secured to the top wall of the sheet metal casing. Each of the plates 74 has its lower edge inwardly flanged as at 76. Secured to such flanges are fill-in portions 77 which are identically dimensioned with, and may actually be, those parts of the duct casing 70 that were cut away on the cut lines 71. For all practical purposes they may be considered as identical with the parts that were removed. These fill-in portions close the entrances and have rail portions which continue the rail flanges 72.

When the carrier plates 74 are in the position of Fig. 6, that is to say swung open, the insertion of a trolley or collector into the duct at the entrance may readily be effected, the duct having no bottom at the entrance; however, for normal use the carrier plates 74 are swung inwardly to the position of Fig. 5 so that the fill-in parts 77 will occupy the position they occupied before they were cut away from the duct. The bottom of the duct will now be closed and will be restored to its original position.

For holding the carrier plates against the sheet metal casing there is provided a "C" clamp 80, surrounding the duct and loosely slidable therealong. With the "C" clamp are provided threaded wing screws 81 adapted to bear against the top surface of the duct. When the screws are fully retracted, the "C" clamp will drop from the position of Fig. 5, and may be slid, from a point adjacent the hinges 75, where it engages the ends of the plates 74, longitudinally along the duct to clear the plates 74 and permit these to be moved to the position of Fig. 6.

When it is desired to close the duct, the carrier plates are returned to the position of Fig. 5 and the "C" clamp is returned to its clamping position and is then pulled upwardly by means of the threaded screws 81, to the position of Fig. 5, where it clamps the carrier plates in place.

It is observed that the screws 81 thread through the clamp 80 and that their lower ends bear against the upper surface of the sheet metal casing 70. Accordingly, when the screws are rotated or threaded further into the "C" clamp they not only pull the "C" clamp up but, also, due to the engagement of the "C" clamp with the carrier plates, cause proper alignment of the carrier plates and the fill-in parts 77 carried thereby with the remaining parts of the duct structure.

It is further noted that the "C" clamp supports the weight of the plates 74 and the trolleys which are supported by the rail portions of the fill-in parts 77, when the duct is closed, thus relieving the hinges 75 from the necessity of so supporting the parts. The plates 74 are free of the necessity of supporting trolleys, when they are swung open, and accordingly, do not stress the hinges more than is required by their own weight, and then only during the few moments when a trolley is being introduced into the duct through the intermediate entrance.

It will also be observed that within the length of the drop-out section, insulation pieces 82 of triangular cross section are provided under the side bus bars B to facilitate trolley insertion by guiding the side thrust rollers to the bus bars easily and smoothly.

In a plain entrance section, i. e., one which is not of the sectionalizing kind, the bus bars are continuous from the section end to section end, or from juncture to juncture. In a sectionalizing entrance section, each bus run B is cut to provide a gap 90 predetermined to be of sufficient dimension to isolate the part 91 of each bus run from the part 92 thereof, with the result that disturbances in that portion or those sections of the bus duct run supplied by one set of feeders F are localized and confined to that portion or those sections, and are not transmitted to the other portions or sections of the bus duct run.

In determining the dimension of a gap, care is taken to make it as small as possible, to minimize the interruption of current flow to the roller R riding thereon as it crosses the gap, consistent with the requirement that the gap be large enough to prevent current, even under extraordinary and disturbance conditions, from jumping the gap from one bus run part 91 to the other part 92, or from crossing the gap through a roller simultaneously contacting both bus bar parts.

It is observed that the gap of one bus run is staggered with respect to that of its adjacent bus run. This relation is determined by the staggered relation of the rollers R of the trolley T shown in phantom in the duct and to whose design the design of the duct is correlated, the aim being that all of the rollers cross the gaps at the same time so that the interruption of contact between the set of rollers and the set of bus runs will be simultaneous and as brief as possible. In the design shown, the gap staggering is identically dimensioned with the roller staggering.

While the gaps might be left with nothing more than air spaces between them, these serving as insulators between the gapped parts of the bus run, insulators such as the tongues 94 of the bridge pieces 95 of insulation material might be used, and reliance may be placed upon the superior insulating quality of these tongues to shorten the gaps from what they might be if air were used as the insulating medium in the gaps.

It is observed that the tongues are spaced from the bus bar ends so that greater creepage spaces are provided than would be the case if the tongues abutted the bus bar ends. In addition these spaces provide heat expansion spaces for the bus bars and also provide tolerance for length discrepancies that sometimes occur in manufacturing bus duct.

The tongues, besides serving as insulators, also serve as bridges between bus bar ends, preventing the rollers R from dropping into the gaps and becoming injured and also connecting the spaced bus bar ends. Since the tongues are too small to be conveniently assembled in the duct, they are formed as parts of bridge pieces 95 and these pieces also function as bridges for the rollers, these being considerably wider than the bus bars so that they roll on the bridge pieces at the gaps. If desired, the tongues may well be omitted and the bridge pieces without them may be relied upon to provide bridges upon which the rollers may roll as they cross the gaps. However, it has been found, upon test, that the provision of the tongues materially reduces the probability of current jumping the gap, even as rollers cross.

The bridge pieces are grooved at 96 to provide creepage and metal dust collecting spaces, but might be left flush with the bus bar surfaces. In the case of the bus run that is at the top of the duct two T shaped bridge pieces are used, as shown. In the case of the bus runs on the sides of the duct, one T-shaped bridge piece is used, as shown, and reliance is placed upon the adjacent guide pieces 82 to cooperate with the side bridge pieces to provide two bridge surfaces for each gap.

It is feasible, for promoting the economy of manufacture and the interchangeability of lengths or sections, to have all entrance sections fabricated as sectionalizing sections. If these sections are to be used for sectionalizing purposes the bridge pieces may be of insulation and shaped as shown; but if the sections are not to be used for sectionalizing, the bridge pieces may be of conducting material and properly dimensioned to provide no interruption of current flow to the rollers as they cross the gaps on the bridges.

Concluding it will be observed that several different methods of insuring smooth roll of rollers at gaps are provided, as follows:

(1) The use of side bridge pieces 95 in conjunction with a roller wider than the bus bar;

(2) The use of insulation in the gap;

(3) The use of side bridge pieces 95 in conjunction with a roller wider than the bus bar and the use of insulation in the gap.

It is also contemplated to notch the ends of the bus bar parts at a gap and to provide insulation bridges in such notches, in which case a roller narrower than the bus bar might well be used without "bumping" or "clicking" as it crosses the gap.

We claim:

1. In a sectional trolley duct run, continuous runs of bus and duct formed by standard bus duct sections joined end to end, and sectionalizing bus duct sections between continuous runs, the sectionalizing sections having gapped bus bar runs, the standard and the sectionalizing sections being of the same length so as to be freely interchangeable.

2. For trolleys having longitudinally and laterally spaced collector contacts, trolley bus duct having intermediate entrances formed by cutaway parts of the duct and closed by movable fill-in parts, bus bars of the duct being gapped at the entrances, the lateral and longitudinal spacing of the gaps conforming to the lateral and longitudinal spacing of the collector contacts of the trolleys.

3. An interchangeable sectional trolley duct run made up of standard bus duct sections whose ducts and bus bars are continuous from end to end, and sectionalizing entrance sections whose ducts are cut away to provide entrances closed by movable fill-in covers, and whose bus bars are gapped between their ends in registry with the entrances, all the sections, though of various types, being of the same length so as to be freely interchangeable.

4. In a multiphase trolley bus system for use with a multiphase trolley collector whose collector contacts are longitudinally and laterally spaced, separately phased bus bars having gaps longitudinally and laterally spaced along the duct with a spacing complementary to that of the trolley contacts whereby all phases will be open simultaneously as the collector rolls along the bus bars.

5. Trolley bus duct having intermediate entrances formed by cut-away parts of the duct and closed by movable fill-in parts, bus bars of the duct being gapped at the entrances, and means for bridging the gap and also directing onto the bus bar a roller contact inserted into the duct through the entrance.

6. For use with trolleys, trolley bus duct having a trolley entrance in its bottom wall, bus bars on and projecting from insulated opposite vertical surfaces of the duct and disposed above the entrance, and means adjacent the bus bars and positioned to be engaged by contacts of trolleys to be inserted into the duct through the entrance before these contacts engage the bus bars comprising inclined surfaces of insulation which move the contacts in opposite directions, transverse to the direction of the insertion of the trolleys into the duct, and direct the contacts onto the bus bars and center the trolleys in the duct, the aforesaid means comprising the sole means for centering the trolleys in the duct during trolley insertion, the aforesaid means being so located with respect to the duct entrance that the means are engaged by the trolley contacts before any other part of the trolley engages any other part of the duct.

7. For use with trolleys, trolley bus duct having a trolley entrance in a wall thereof, bus bars on and projecting from insulated opposite vertical surfaces of the duct, and means adjacent the bus bars and positioned to be engaged by contacts of trolleys to be inserted into the duct through the entrance before these contacts engage the bus bars comprising inclined surfaces of insulation which move the contacts in opposite directions, transverse to the direction of the insertion of the trolleys into the duct, and direct the contacts onto the bus bars, and center the trolleys in the duct, the aforesaid means being so located with respect to the duct entrance that the means are engaged by the trolley contacts before any other part of the trolley engages any other part of the duct, the bus bars being gapped at the entrance and having insulation bridge pieces between the gaps, the gaps having a lateral and a longitudinal spacing complementary to those of the trolley contacts.

WILLIAM A. HARPER.
HARRISON J. L. FRANK.